(12) United States Patent
Moon et al.

(10) Patent No.: US 7,460,439 B2
(45) Date of Patent: Dec. 2, 2008

(54) ULTRASONIC TRANSDUCER FOR RANGING MEASUREMENT WITH HIGH DIRECTIONALITY USING PARAMETRIC TRANSMITTING ARRAY IN AIR AND A METHOD FOR MANUFACTURING SAME

(75) Inventors: Wonkyu Moon, Kyungsangbuk-do (KR); Haksue Lee, Kyungsangbuk-do (KR)

(73) Assignees: Postech Foundation, Kyungsangbuk-do (KR); Postech Academy Industry Foundation, Kyungsangbuk-do (KR)

( * ) Notice: Subject to any disclaimer, the term of this patent is extended or adjusted under 35 U.S.C. 154(b) by 118 days.

(21) Appl. No.: 11/528,463

(22) Filed: Sep. 28, 2006

(65) Prior Publication Data
US 2008/0013405 A1 Jan. 17, 2008

(30) Foreign Application Priority Data
Jul. 13, 2006 (KR) .................... 10-2006-0065731

(51) Int. Cl.
*G01S 15/10* (2006.01)
(52) U.S. Cl. ....................................... 367/92

(58) Field of Classification Search ................ 367/92; 381/191
See application file for complete search history.

(56) References Cited

U.S. PATENT DOCUMENTS

| | | | | |
|---|---|---|---|---|
| 3,924,259 | A | * | 12/1975 | Butler et al. ............. 367/92 |
| 4,207,620 | A | * | 6/1980 | Morgera .................. 367/92 |
| 6,775,388 | B1 | * | 8/2004 | Pompei .................. 367/181 |
| 7,196,970 | B2 | * | 3/2007 | Moon et al. .............. 367/92 |
| 2005/0276163 | A1 | * | 12/2005 | Moon et al. .............. 367/92 |
| 2008/0013405 | A1 | * | 1/2008 | Moon et al. .............. 367/92 |

FOREIGN PATENT DOCUMENTS
JP 2005351897 A * 12/2005

* cited by examiner

*Primary Examiner*—Dan Pihulic
(74) *Attorney, Agent, or Firm*—Bacon & Thomas, PLLC

(57) ABSTRACT

A multiple resonances type ultrasonic transducer for a ranging measurement with high directionality using a parametric transmitting array in air, includes an ultrasonic actuator unit formed with a regularly mixing array of first unit actuators having a resonance frequency of $f_1$ and second unit actuators having a resonance frequency of $f_2$. The ultrasonic actuator unit generates a difference frequency wave ($f_d = f_1 - f_2$) with high directionality by forming a parametric transmitting array in air through generating two ultrasonic waves with high pressure in air. Further, the transducer includes an ultrasonic sensor unit formed with one or more unit sensors having a resonance frequency of the difference frequency ($f_d = f_1 - f_2$), for sensing a reflected ultrasonic pulse signal from a target.

19 Claims, 9 Drawing Sheets

SQUARE TYPE
MIXING ARRAY

HEXAGONAL TYPE
MIXING ARRAY

RING TYPE
MIXING ARRAY

GENERAL MEMBRANE TYPE

CANTILEVER TYPE

PISTON TYPE

GENERAL MEMBRANE TYPE

CANTILEVER TYPE

PISTON TYPE

ULTRASONIC TRANSDUCER FOR RANGING MEASUREMENT WITH HIGH DIRECTIONALITY USING PARAMETRIC TRANSMITTING ARRAY IN AIR AND A METHOD FOR MANUFACTURING SAME

FIELD OF THE INVENTION

The present invention relates to a multiple resonances type ultrasonic transducer based on MEMS (Micro Electro Mechanical Systems) for an ultrasonic ranging measurement with high directionality using a parametric transmitting array in air and, more particularly, to an ultrasonic transducer suitable for an ultrasonic ranging measurement using a parametric transmitting array in air.

BACKGROUND OF THE INVENTION

It is informed that, the present invention relates to an ultrasonic transducer applicable to Korean Patent Application No. 10-2004-0042299, "High directional ultrasonic ranging measurement system and method in air using parametric array", commonly assigned to the applicant of the present invention and, U.S. patent application Ser. No. 10/960083 and Japanese Patent Application No. 2005-169938, "Ultrasonic ranging system and method thereof in air by using parametric array", both based on a priority of the aforementioned Korean Patent Application.

Herein, the term "ultrasonic transducer" indicates both a unit of an ultrasonic actuator and an ultrasonic sensor, serving as a transmitter and a receiver, respectively, together in a pulse-echo ranging measurement method using ultrasonic waves.

An ultrasonic ranging measurement method using parametric transmitting array will be first described with reference to FIG. 1.

If an ultrasonic actuator serving as a high frequency generator radiates a high pressure ultrasonic wave (primary wave) having two frequency components, $f_1$ and $f_2$, toward a same direction, the ultrasonic wave radiated will form a high directional difference frequency wave (i.e., a secondary wave, $f_d = f_1 - f_2$) for a ranging measurement due to nonlinear effects while progressing. Ultimately, if the difference frequency wave comes back after being reflected from a target while progressing, an ultrasonic sensor will receive this reflected wave.

A combination of an ultrasonic actuator and an ultrasonic sensor serves as an ultrasonic transducer for generating and sensing pulse signals required in a ranging measurement.

There has been a variety of conventional ultrasonic transducers according to a driving method thereof such as a voice coil transducer, a capacitive transducer, a piezoelectric transducer, a magnetostrictive transducer, and a MUT (Micromachined Ultrasonic Transducer) manufactured via MEMS.

Among the aforementioned transducers, the piezoelectric and the capacitive transducer have been the most generally used transducers for a ranging measurement at present. In case of the piezoelectric transducer, an actuator for transmitting and a sensor for receiving are generally detached, whereas the capacitive transducer is often used as a reversible transducer which serves both as a transmitter and a receiver.

It is noted that, the MUT type transducer using a piezoelectric body as a driving material is called a pMUT (piezoelectric Micro-machined Ultrasonic Transducer), and because of the characteristics of MEMS, the pMUT is suitable for an ultrasonic transducer with high frequency. Further, because of the small size of the unit ultrasonic actuators, the pMUT generally has a plurality of small unit ultrasonic actuators arranged therein for improving its output power.

The aforementioned ultrasonic transducers known so far are, however, not suitable for a ranging measurement using a parametric transmitting array. Hereinafter, the cause for such problem, a plan to overcome the problem and the like will be separately explained for the cases of the ultrasonic actuator and the sensor.

Ultrasonic Actuator

In order to generate a difference frequency wave by forming a parametric transmitting array, an ultrasonic actuator is essentially required to generate an ultrasonic wave having two frequency components toward a same direction (Condition I). Moreover, the ultrasonic actuator is needed to generate the difference frequency wave with high efficiency due to the weak nonlinear properties in air. In other words, in order to achieve a good efficiency of generating the difference frequency wave, first, the wave is required to be generated to have a large sound pressures ($p_0 = p_1 = p_2$, Condition II); second, the transducer is needed to have a large size (Condition III); and lastly, the frequency difference between the two high frequencies ($f_d = f_1 - f_2$) is required to be large (Condition IV).

However, there are some practical limits in use of the transducer for a ranging measurement in air. In particular, in order to be applied to a small sized system such as a robot, the transducer needs to be very small, which does not satisfy the condition III. Further, there is a limit on increasing the frequency difference between the two frequency components because the attenuation effect of the ultrasonic waves is in proportion to the second power of the frequency, which fails the condition IV.

Accordingly, an ultrasonic actuator should be designed to maximize the condition II while satisfying the condition I. In other words, it is required to provide an ultrasonic actuator capable of having a large output at two frequency bands while maintaining a small size.

However, all of the conventional ultrasonic actuators correspond to a single resonance type, thereby failing to provide a sufficient output at two frequency bands. In addition, if an ultrasonic actuator is designed to be kept in small size, the radiation area thereof will also get small, and as a result, the output thereof will be too small. It is, therefore, impossible to apply such actuators to a ranging measurement using a parametric transmitting array.

Ultrasonic Sensor

In accordance with the conventional ultrasonic ranging measurements, the frequency of the wave generated by an ultrasonic actuator and that of the wave measured by an ultrasonic sensor are identical, thus the ultrasonic sensor has the same resonance frequency as that of the ultrasonic actuator.

However, in a ranging measurement method using a parametric transmitting array, the frequency band of the ultrasonic wave primarily generated by an actuator is very different from that of the ultrasonic wave measured by a sensor. It is, therefore, very difficult to apply such conventional sensors to a ranging measurement using a parametric transmitting array.

SUMMARY OF THE INVENTION

It is, therefore, an object of the present invention to provide a pMUT type ultrasonic transducer suitable for a ranging measurement with high directionality using a parametric transmitting array in air, wherein the ultrasonic actuator part and sensor part thereof are integrated via MEMS.

In accordance with one aspect of the present invention, there is provided a multiple resonances type ultrasonic transducer for a ranging measurement using a parametric transmitting array in air, including:

an ultrasonic actuator unit formed with a regularly mixing array of first unit actuators having a resonance frequency of $f_1$ and second unit actuators having a resonance frequency of $f_2$, for generating a difference frequency wave ($f_d=f_1-f_2$) with high directionality by forming a parametric transmitting array in air through generating two ultrasonic waves with high pressure in air; and an ultrasonic sensor unit formed with one or more unit sensors having a resonance frequency of the difference frequency ($f_d=f_1-f_2$), for sensing a reflected ultrasonic wave signal from a target.

In accordance with another aspect of the present invention, there is provided a method for manufacturing multiple resonances type ultrasonic transducer for a ranging measurement with high directionality using a parametric transmitting array in air, including the steps of:

preparing a SOI (Silicon on Insulator) wafer with an intermediate oxidation layer;

insulating the SOI wafer by forming thin oxidation layers on the top and the bottom surfaces of the wafer;

forming a lower electrode, a piezoelectric body, and an upper electrode to be laminated in sequence on the top surface of the SOI wafer;

patterning the upper electrode, the piezoelectric body, and the lower electrode;

forming an insulating layer for insulating the upper electrode and the lower electrode;

forming a lining pattern by patterning the insulating layer; and forming the membrane portion by removing the lower side of the central portion of the wafer and the intermediate oxidation layer after removing the oxidation layer on the bottom surface of the wafer.

BRIEF DESCRIPTION OF THE DRAWINGS

The above and other objects and features of the present invention will become apparent from the following description of preferred embodiments given in conjunction with the accompanying drawings, in which:

FIGS. 5A and 5B illustrate explanatory views showing a structure for a membrane portion of the unit actuator or the unit sensor in the ultrasonic transducer in accordance with the present invention, wherein FIG. 5A shows a plan view of a general type membrane portion and FIG. 5B shows a sectional view thereof;

FIGS. 6A and 6B describe explanatory views showing a structure for the membrane portion of the unit actuator or the unit sensor in the ultrasonic transducer in accordance with the present invention, wherein FIG. 6A shows a plan view of a cantilever type membrane portion and FIG. 6B shows a sectional view thereof;

FIGS. 7A and 7B present explanatory views showing a structure for the membrane portion of the unit actuator or the unit sensor in the ultrasonic transducer in accordance with the present invention, wherein FIG. 7A shows a plan view of a piston type membrane portion and FIG. 7B shows a sectional view thereof;

DETAILED DESCRIPTION OF THE PREFERRED EMBODIMENTS

Hereinafter, preferred embodiments of the present invention will be described in detail with reference to the accompanying drawings.

Figure 1:
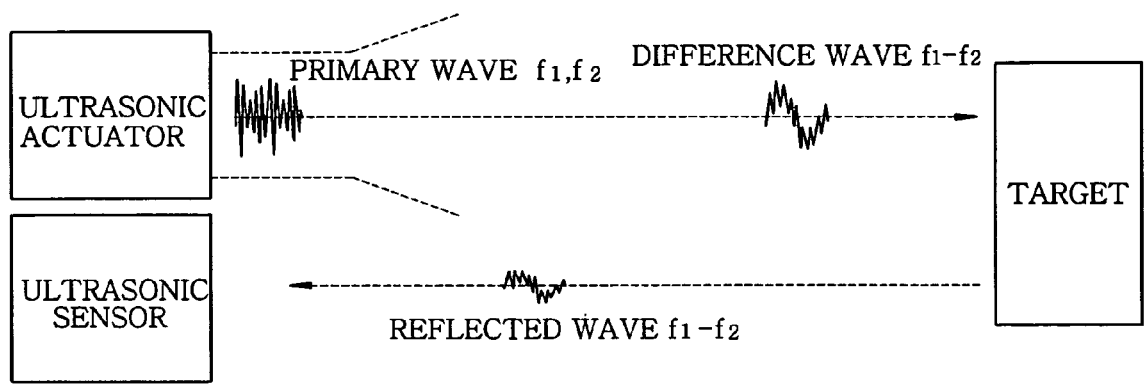
FIG. 1 shows a conventional ranging measurement method using a parametric transmitting array.
Figure 2:
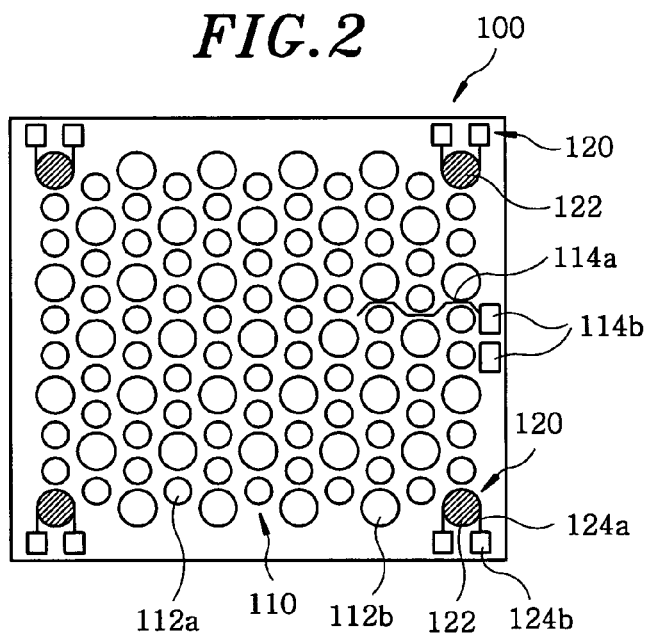
FIG. 2 is a schematic plan view showing a pMUT type ultrasonic transducer for a ranging measurement using a parametric transmitting array in accordance with the present invention.

FIG. 2 is a schematic plan view showing a pMUT type ultrasonic transducer for a ranging measurement using a parametric transmitting array in accordance with the present invention.

In accordance with the present invention, there is provided an ultrasonic transducer 100 having an ultrasonic actuator unit 110 and an ultrasonic sensor unit 120. The ultrasonic actuator unit 110 is formed with a mixing array of two types of small unit actuators 112a and 112b, each having a resonance frequency of $f_1$ and $f_2$, in order to primarily radiate the two frequency components $f_1$ and $f_2$ in a strong pulse type in air for a ranging measurement using a parametric transmitting array in air. Further, the ultrasonic sensor unit 120 has a resonance frequency of a difference frequency ($f_d=f_1-f_2$), thereby having high sensitivity to measure a returned ultrasonic wave after being reflected from a target and capable of decreasing the inflow of primarily generated frequency components $f_1$ and $f_2$ thereinto.

In particular, the ultrasonic transducer 100 includes the ultrasonic actuator unit 110 formed with a regularly mixing array of unit actuators 112a having a resonance frequency of $f_1$ (hereinafter, referred to as $f_1$ resonance type unit actuators) and unit actuators 112b having a resonance frequency of $f_2$ (hereinafter, referred to as $f_2$ resonance type unit actuators), for generating a difference frequency wave ($f_d=f_1-f_2$) with high directionality by forming a parametric transmitting array in air through generating two ultrasonic waves with high pressure in air; and the ultrasonic sensor unit 120 formed with one or more (four in FIG. 2) unit sensors 122 having a resonance frequency of the difference frequency ($f_d=f_1-f_2$), for sensing a reflected ultrasonic wave signal from a target.

Further, there are provided a lining pattern 114a for electrically connecting the unit actuators 112a and/or 112b of the ultrasonic actuator unit 110 with each other and a pair of connecting terminals 114b for electrically connecting the lining pattern 114a with the outside voltage source. Also, one or more (four in FIG. 2) lining patterns 124a and one or more (four in FIG. 2) pairs of connecting terminals 124b are separately provided to the respective unit sensors 122 of the ultrasonic sensor unit 120.

Basically, according to the present invention, the ultrasonic actuator unit 110 and the ultrasonic sensor unit 120 are driven independently, and also are fully independent in electrical sense in order to prevent an inflow of the electrical signals, applied to the ultrasonic actuator unit 110 for an operation thereof, into the ultrasonic sensor unit 120. Moreover, the respective unit sensors 122 of the ultrasonic sensor unit 120 are also fully independent.

The ultrasonic transducer 100 in accordance with the present invention is basically a MUT type capable of being manufactured in a very thin plate form via MEMS, and more particularly a pMUT type, because a piezoelectric body is used as a driving material in order to achieve high outputs by using a resonance effect at an ultrasonic frequency band required.

As for the manufacturing, the ultrasonic actuator unit 110 and the sensor unit 120 can be integrally fabricated on a same substrate, e.g., wafer, and formed to have a same laminated structure.

That is, all of the $f_1$ resonance type unit actuators 112a, the $f_2$ resonance type unit actuators 112b, and the unit sensors 122 have an identical laminated structure, and thus can be manufactured on a single substrate via one MEMS process.

Figure 3:
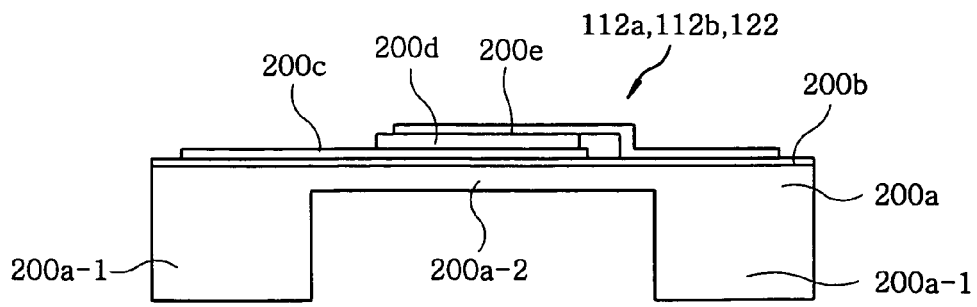
FIG. 3 provides a sectional view showing a laminated structure common to an unit actuator and an unit sensor, in a pMUT type ultrasonic transducer in accordance with the present invention.

FIG. 3 provides a sectional view showing a laminated structure common to an unit actuator and an unit sensor.

Referring to FIG. 3, the laminated structure includes a substrate part 200a, wherein the outer portion thereof is formed as a thick fixed supporting portion 200a-1 and the central portion thereof is formed as a thin membrane portion 200a-2 so that the membrane portion 200a-2 can be vibrated vertically; an insulating layer 200b formed on the top surface of the substrate part 200a, for insulating the substrate part 200a when needed; a lower electrode 200c formed on top surface of the substrate part 200a; a piezoelectric body 200d formed on the lower electrode 200c, for generating a vibration of the membrane portion 200a-2 by vibrating itself vertically according to an applied voltage thereto; and an upper electrode 200e, formed on the piezoelectric body 200d, for applying a predetermined voltage to the piezoelectric body 200d together with the lower electrode 200c.

The upper electrode 200e and the lower electrode 200c are connected with the aforementioned lining pattern 114a or 124a for an electrical connection.

The substrate part 200a may be manufactured with a silicon (Si) wafer and is driven passively, therefore, generation of ultrasonic waves or detection of reflected ultrasonic waves is performed by vertically vibrating the membrane portion 200a-2 of the substrate part 200a by using the piezoelectric body 200d serving as a driving material.

In this regard, because the piezoelectric body 200d is required to be subjected to an applied voltage in order to be vibrated mechanically and vertically, a voltage signal is applied via the upper electrode 200e and the lower electrode 200c. More particularly, the membrane portion 200a-2 moves upward in case the upper electrode 200e becomes the positive pole and the lower electrode 200c is grounded, whereas the membrane portion 200a-2 moves downward in case the upper electrode 200e is grounded and the lower electrode 200c becomes the positive pole. That is, the membrane portion 200a-2 vertically vibrates according to the level and the polarity of a sine wave voltage applied thereto.

Consequently, the combining of the lower electrode 200c, the piezoelectric body 200d and the upper electrode 200e may be referred to as a piezoelectric driving portion, and the membrane portion 200a-2 and the piezoelectric body 200d may form a micro-mini radiating plate having an excellent sound impedance matching, i.e., sound generating efficiency, in air.

Hereinafter, a variety of representative mixing arrays for the two types of unit actuators forming the ultrasonic actuator unit 110, i.e., the $f_1$ resonance type unit actuators 112a and the $f_2$ resonance type unit actuators 112b, will be described with reference to FIGS. 4A, 4B and 4C.

Figure 4A:
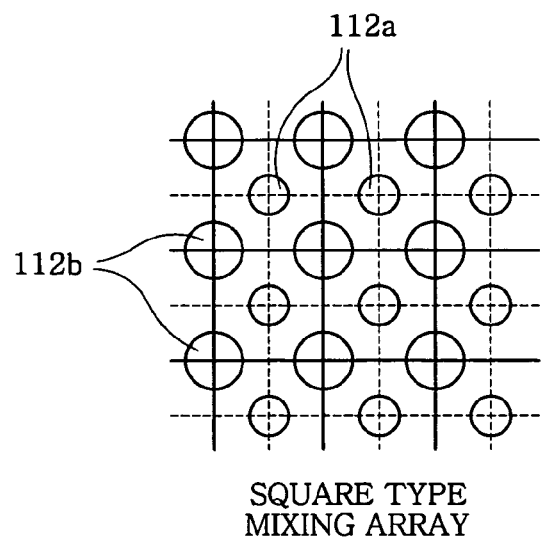
FIGS. 4A, 4B and 4C present explanatory views, showing a mixing array for two types of unit actuators, each having different resonance frequencies with each other, of the ultrasonic transducer in accordance with the present invention.
Figure 4B:
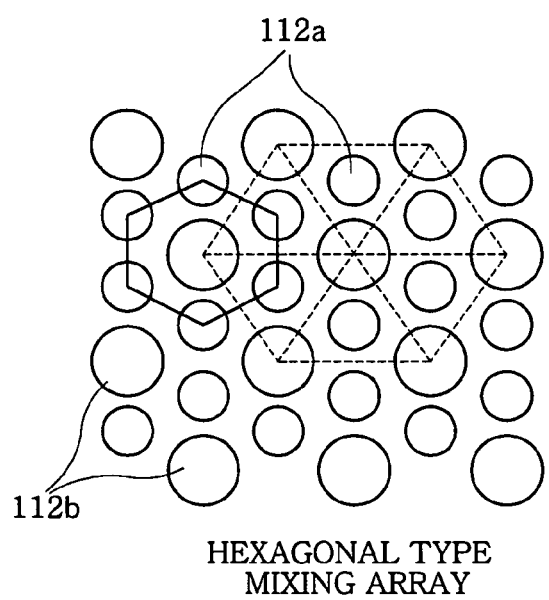
Figure 4C:
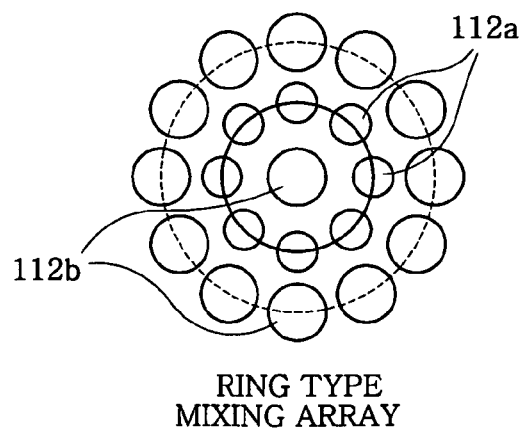
Figure 5A:
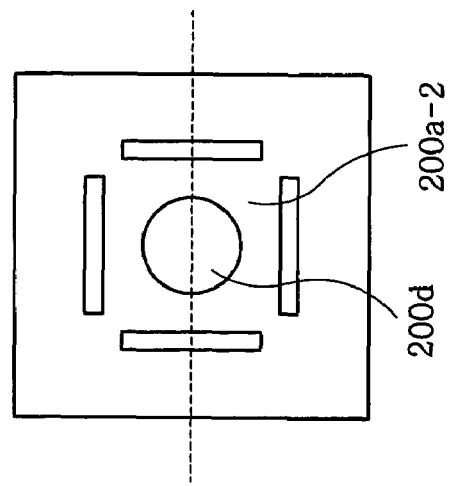
Figure 6A:
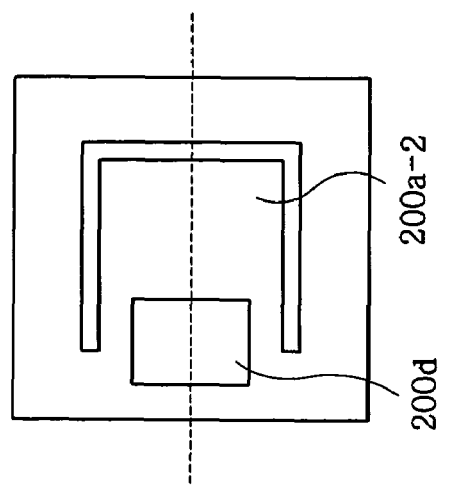
Figure 7A:
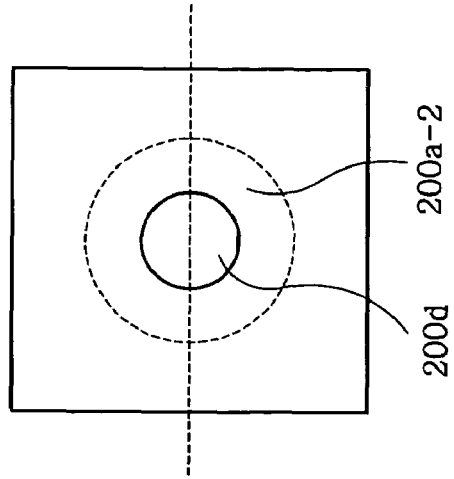
Figure 5B:
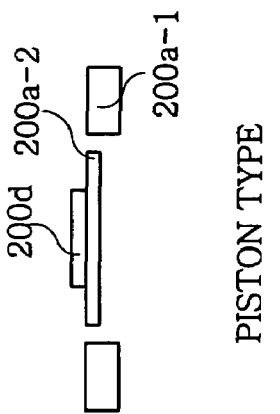
Figure 6B:
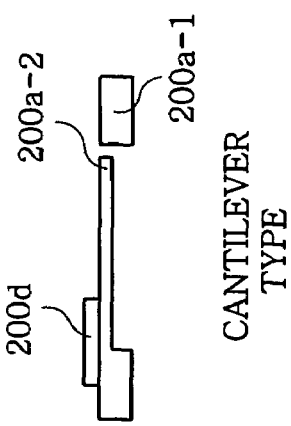
Figure 7B:
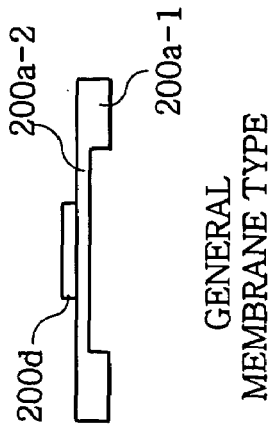

For convenience, the $f_1$ resonance type unit actuators 112a are shown as small circles and the $f_2$ resonance type unit actuators 112b are shown as large circles in FIGS. 4A, 4B and 4C.

The two types of the unit actuators 112a and 112b are arrayed as follows: one type of the unit actuators 112a or 112b are arranged initially and then the other type of the unit actuators 112a or 112b are arranged therebetween. A variety of practicable mixing arrays are presented in FIGS. 4A, 4B and 4C.

In FIGS. 4A, 4B and 4C, there are provided three types of mixing arrays, i.e., (a) a square type mixing array, (b) a hexagonal type mixing array, and (c) a ring type mixing array.

Among the three types of mixing arrays, (b) a hexagonal type mixing array is the best one particularly for achieving a high sound generating efficiency and making the ultrasonic waves generated in phase (a destructive interference occurs in case of being out of phase).

In the type (b), the arraying may be performed in order to maximize the sound generating efficiency between the unit actuators 112a and 112b and make the ultrasonic waves generated in phase, specifically as below.

A relationship between $a_1$, $d_1$ and $\lambda_1$, follows Equation 1, wherein $a_1$ is a radius of the membrane portion 200a-2 of certain resonance type unit actuators 112a or 112b, $d_1$ is a length of one side of the hexagon, and $\lambda_1$ is a wavelength in air of the ultrasonic waves generated having a frequency of a driving frequency.

$$4a_1 = d_1, \; d_1 \approx \frac{5}{4}\lambda_1 \qquad \text{Equation 1}$$

By using Equation 1, one of the resonance type unit actuators 112a and 112b are arranged on a hexagonal type mixing array, and then the other of either the resonance type unit actuators 112a or 112b are arranged therebetween also in a hexagonal form.

On the other hand, there are a variety of structures for the membrane portion 200a-2, as shown in FIGS. 5A to 7B.

In FIGS. 5A to 7B, three types of structures, i.e., (a) a general membrane type, (b) a cantilever type, and (c) a piston type are provided.

Among the three types, the entire outer part of the membrane portion 200a-2 is coupled with the fixed supporting portion 200a-1 in case of the type (a), whereas some of the outer part is cutoff and forms free ends in case of the type (b) or the type (c). Specifically, only one side of the membrane portion 200a-2 is coupled with the fixed supporting portion 200a-1 in the type (b) and only vertexes are coupled in the type (c).

Figure 8A:
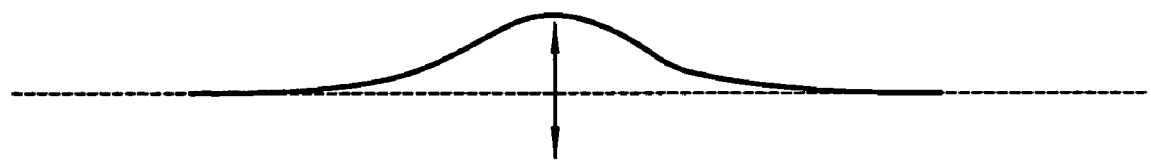
FIGS. 8A, 8B and 8C provide explanatory views showing an operation of the membrane portion having one of the number of structures shown in FIGS. 5A to 7B.
Figure 8B:
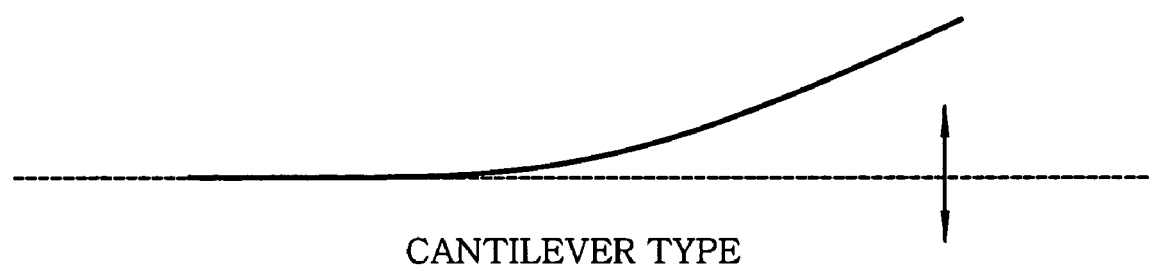
Figure 8C:
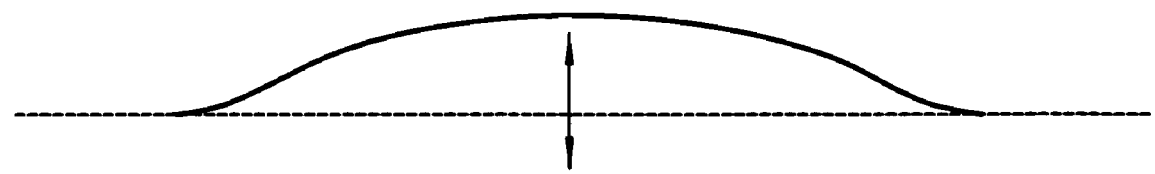

Accordingly, a coupling level of the membrane portion 200a-2 decreases in the order of (a) general membrane type, (b) cantilever type, and (c) piston type, and thus a spring coefficient decreases in the same order. Therefore, a variety of vibrations can be formed, each having a different amplitude, as shown in FIGS. 8A, 8B and 8C.

By changing the spring coefficient of the membrane portion 200a-2, i.e., by applying (a) general membrane type, (b) cantilever type or (c) piston type while the size of the membrane portion 200a-2 is equal to or greater than that of the unit actuators 112a and 112b, the resonance frequency of the unit sensors 122 required to have much lower resonance frequency than unit actuators 112a and 112b may be decreased.

In other words, because the entire ultrasonic transducer 100 is manufactured via a same MEMS process, a thickness of the membrane portion 200a-2 of the unit actuators 112a and 112b of the ultrasonic actuator unit 110 and that of the unit sensors 122 of the ultrasonic sensor unit 120 become identical. There are, therefore, two methods for decreasing the resonance frequency of the unit sensors 122 while keeping the thickness of the membrane portion 200a-2 thereof. The first method is increasing the size of the membrane portion 200a-2 of the unit sensors 122 to be larger than that of the unit actuators 112a and 112b, and the second method is applying a membrane structure type having a low spring coefficient to the membrane portion 200a-2 of the unit sensors 122 as discussed above.

On the other hand, in accordance with the present invention, the ultrasonic sensor unit 120 has a resonance frequency of the difference frequency ($f_d = f_1 - f_2$), thereby having a highly improved detecting sensitivity (i.e., receiving sensitivity) and also functioning as a mechanical notch filter.

The mechanical notch filter functions in the following manners. Because the difference frequency component $f_d$ generated via a parametric transmitting array is an indirectly generated component by nonlinear effects, the sound pressure thereof becomes extremely low compared to the frequency components $f_1$ and $f_2$ of the primarily generated waves in case the a target is a short distance away. Therefore, the electrical signal detected by the ultrasonic sensor unit 120 is subjected to a pre-amplifying process such that the signal is amplified to an appropriate level. As a result of the pre-amplifying process, the frequency components $f_1$ and $f_2$ are also amplified along with the difference frequency component $f_d$, thereby having a bad influence on the input terminal of a signal processing unit. At this time, if the ultrasonic sensor unit 120 has a resonance frequency of the difference frequency as in accordance with the present invention, the sensitivity to the frequency components $f_1$ and $f_2$ will be significantly decreased. This will cause the ultrasonic sensor unit 120 to be of exquisite sensitivity only to the difference frequency component.

On the other hand, in the configuration of the entire ultrasonic transducer 100, only one unit sensor 122 may be provided to the ultrasonic sensor unit 120 at the central portion of the ultrasonic transducer 100 or two or more unit sensors 122 may be provided at the appropriate outer portion thereof.

In this connection, in case only one unit sensor 122 is provided at the central portion, the ultrasonic sensor unit 120 performs a function of only detecting the reflected ultrasonic wave, whereas in case two or more unit sensors 122 are provided, the ultrasonic sensor unit 120 performs not only a basic detecting function but also a function of decreasing the interference effect due to side lobes as well as outer noises by some additional operations of the signal processing unit. In other words, the side lobes in some other directions than the central direction may occur due to the characteristics of ultrasonic actuators, and at this time, if the reflected signal is not simultaneously received by the ultrasonic sensors as a result of an analysis of the measured signal in case of adopting two or more ultrasonic sensors, it will be quite probable that the signal is a noise, thereby increasing an accuracy of the signal processing.

In accordance with the present invention, in order to be used smoothly for an ultrasonic ranging measurement, the length of one square side may be determined to be about 30 mm~50 mm when assuming the ultrasonic transducer 100 to be in a shape of a square, whereas the diameter thereof may be set at around 30 mm~60 mm when assuming it to be in a circular shape. Further, the difference frequency $f_d$ may be selected within a range of 20 kHz~60 kHz. If the difference frequency band goes to be less than 20 kHz, a cross with audible sounds will generally occur, and in case of the difference frequency band exceeding 60 kHz, the attenuation effect will become too intense, thereby making the transducer 100 infeasible to be used for a ranging measurement.

Figure 9:
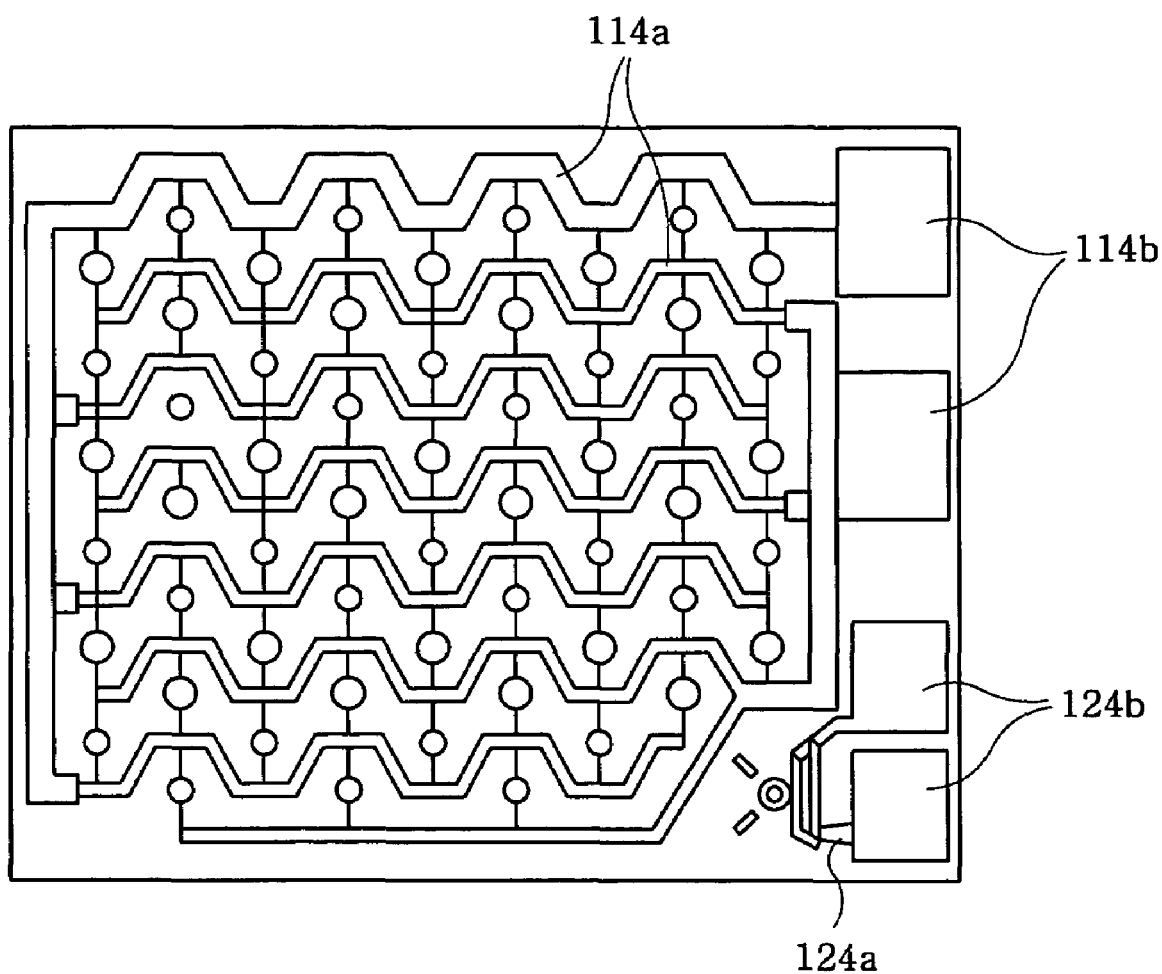
FIG. 9 is an explanatory view showing connecting terminals of the ultrasonic transducer in accordance with the present invention.

Referring to FIG. 9, a pair of connecting terminals 114b is provided at the end portion of the lining pattern 114a for electrically connecting the unit actuators 112a and/or 112b with each other, for electrically connecting the lining pattern 114a with the outside voltage source. The input signal is applied to one of the two terminals 114b and the other is grounded. There are also provided a pair of connecting terminals 124b to the unit sensor 122, and among the two terminals 124b, one is used for an output signal and the other is grounded.

Hereinafter, methods for connecting electrodes in the ultrasonic actuator unit 110 via the aforementioned lining pattern 114a will be described with reference to the FIGS. 10, 11A and 11B.

Figure 10:
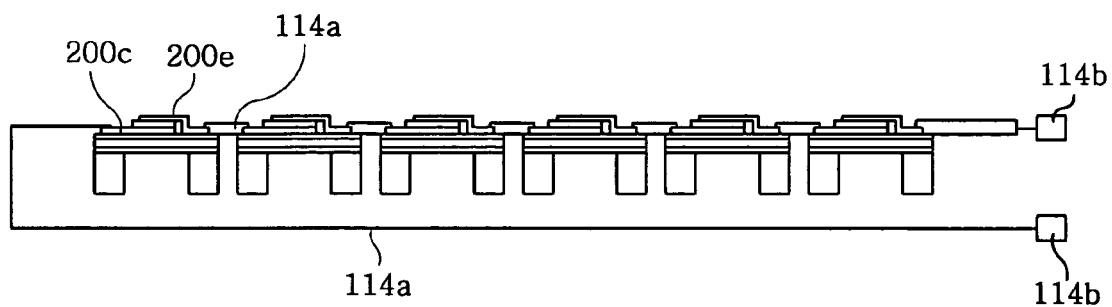
FIG. 10 illustrates a schematic view showing a series connecting method for electrodes of ultrasonic actuator units of the ultrasonic transducer in accordance with the present invention.

FIG. 10 illustrates a series electrode connecting method, wherein an upper electrode 200e of one of the unit actuators 112a and 112b is connected with a lower electrode 200c of its following unit actuator 112a or 112b next thereto. In case of using this method, a phase difference between the electrical signals occurs for each time the signal passes the respective unit actuators 112a and 112b because a piezoelectric body has the same electrical characteristics as that of a capacitor. The phase difference between the electrical signals results in a phase difference (i.e., delay) in the vibrations of the unit actuators 112a and 112b.

Figure 11A:
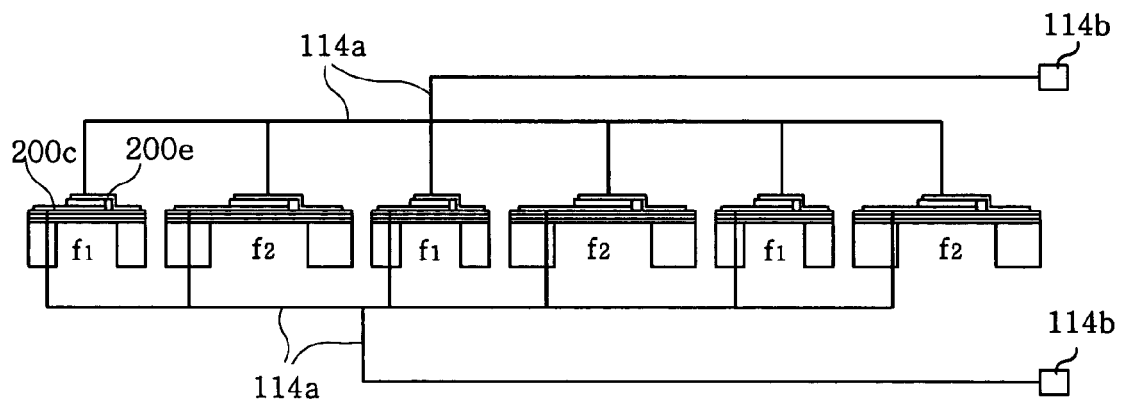
FIGS. 11A and 11B depict schematic views showing two parallel connecting methods for electrodes of ultrasonic actuator units of the ultrasonic transducer in accordance with the present invention.
Figure 11B:
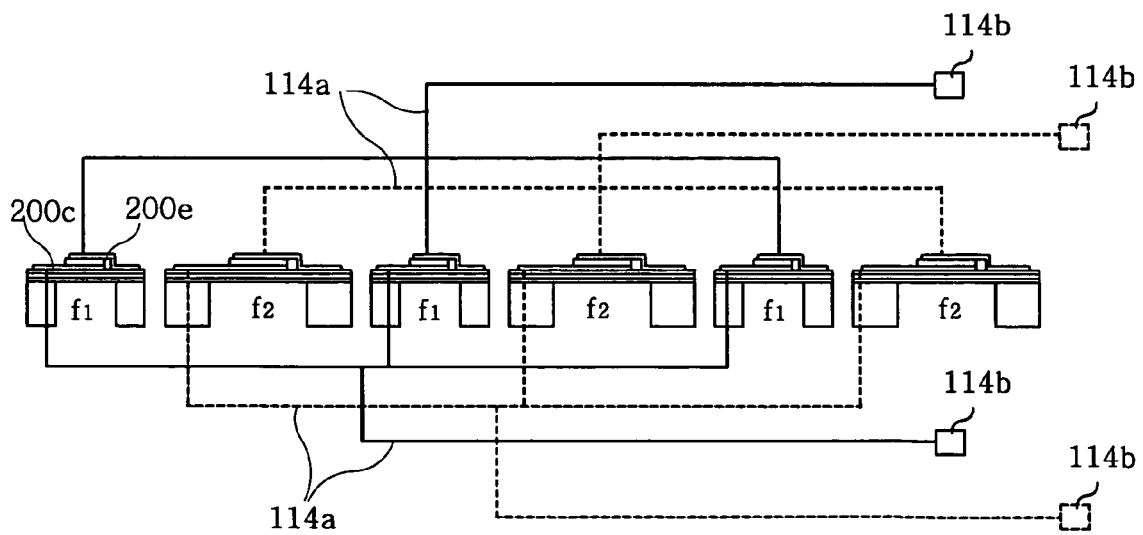

On the other hand, FIGS. 11A and 11B illustrate electrode connecting methods in parallel. In a parallel electrode connecting method, the upper electrodes 200e are connected together and the lower electrodes 200c are connected together, and thus all of the unit actuators 112a and 112b vibrate ideally in phase when a signal is applied to the upper electrodes 200e. Therefore, ultrasonic waves in phase are generated on radiating surfaces of all of the unit actuators 112a and 112b in a mixing array, thereby being very preferable.

There are two types of parallel electrode connecting methods. One of them is a method of connecting the electrodes of both the $f_1$ resonance type unit actuators 112a and the $f_2$ resonance type unit actuators 112b together with each other in parallel (see FIG. 11A). In this case, electrical signal having two frequency components is applied to the input terminal of the connecting terminals 114b after being modulated. The advantage of this method is that the structure of the lining pattern 114a can be simplified and that the output radiated becomes powerful because a sound pressure corresponding to a frequency component $f_2$ is, though slightly, also generated in the $f_1$ resonance type actuators 112a.

Alternatively, the electrodes of the $f_1$ resonance type actuators 112a may be connected with each other in parallel whereas the electrodes of the $f_2$ resonance type actuators 112b may be connected with each other in parallel (see FIG. 11B). In this case, a signal applied to the input terminal of the connecting terminals 114b for the f1 resonance type actuators 112a differs from that for the f2 resonance type actuators 112b.

Figure 12:
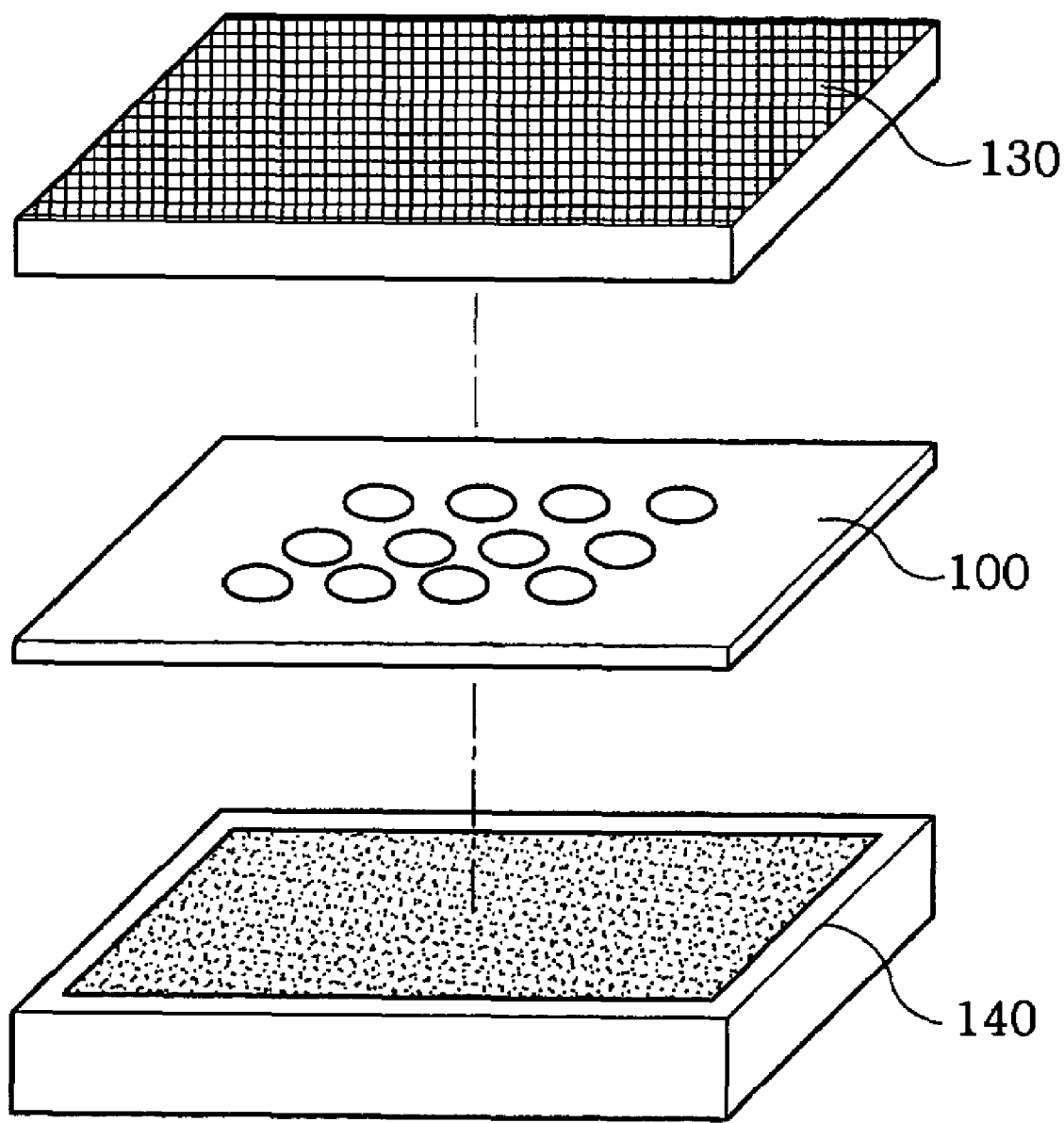
FIG. 12 describes an explanatory view showing an upper and a lower housing to be combined for a practical equipment of the ultrasonic transducer in accordance with the present invention.

As shown in FIG. 12, in order to install and use the ultrasonic transducer 100 practically, separate housings 130 and 140 for respectively protecting the upper and the lower part of the transducer 100 are combined with the transducer 100.

It is preferable that the upper housing 130 combined with the top surface, serving as a radiating surface, of the ultrasonic transducer 100 is of a grill type, thereby enabling the ultrasonic waves to pass therethrough while disabling foreign substances such as a dust being bigger than a predetermined size to enter thereinto. Further, the lower housing 140 combined with the bottom surface of the ultrasonic transducer 100 is manufactured with a sound-absorbing material in order to absorb the ultrasonic waves generated.

Hereinafter, a method for manufacturing the ultrasonic transducer in accordance with a preferred embodiment of the present invention will be sequentially illustrated with reference to FIGS. 13A to 13H.

Figure 13A:
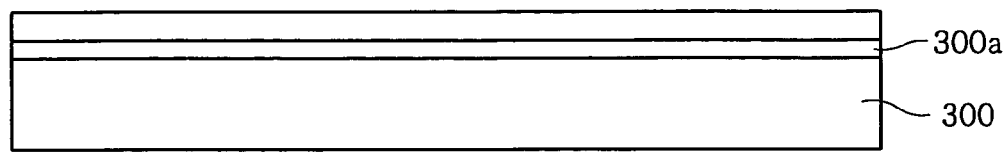
FIGS. 13A to 13H sequentially illustrate a method for manufacturing the ultrasonic transducer in accordance with the present invention.

First, a SOI (Silicon on Insulator) wafer 300 is prepared. The SOI wafer 300 has a laminated structure of three layers with an intermediate oxidation layer 300a between each layer as shown in FIG. 13A. The wafer 300 will finally form the substrate part 200a, and specifically, the upper layer will become the membrane portion 200a-2; the intermediate layer 300a will become, in case of forming the thin membrane portion 200a-2 on the upper layer by deeply removing the lower layer via deep etching or the like, a blockage of a progress of the etching, and the lower layer will become the fixed supporting portion 200a-1 of the substrate part 200a.

Figure 13B:
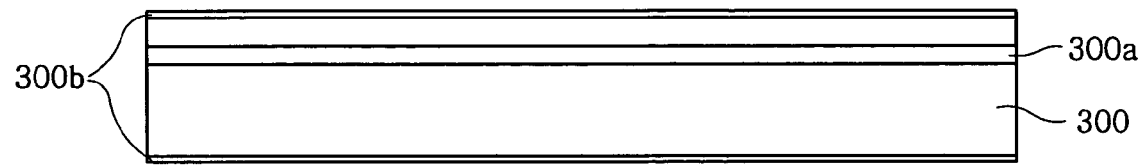

Next, as shown in FIG. 13B, the wafer 300 serving as a semiconductor is completely insulated by forming thin oxidation layers 300b on the top and the bottom surfaces of the SOI wafer 300.

Figure 13C:
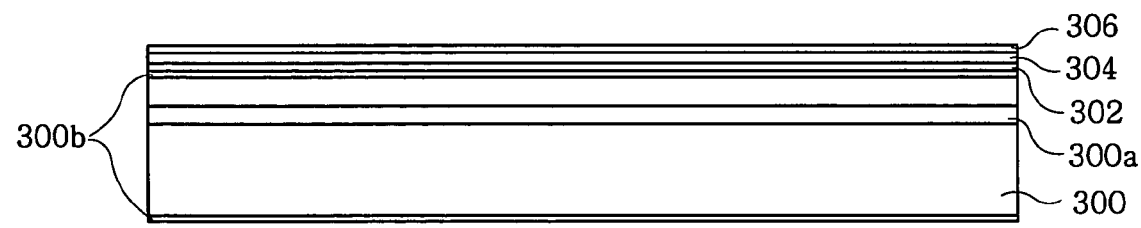

Still next, a lower electrode 302, a piezoelectric body 304, and an upper electrode 306 are laminated in sequence on the top surface of the wafer 300, as shown in FIG. 13C.

Figure 13D:
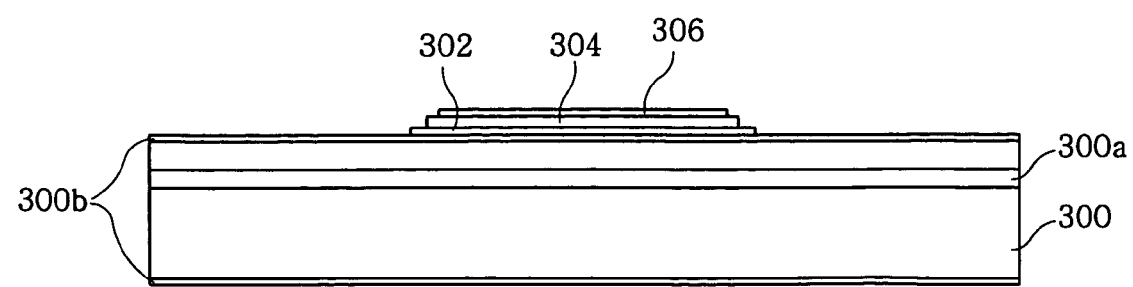

Continuing from the above, as shown in FIG. 13D, a patterning is performed by removing an unnecessary part of the upper electrode 306, the piezoelectric body 304, and the lower electrode 302 in this order via an etching or the like.

Figure 13E:
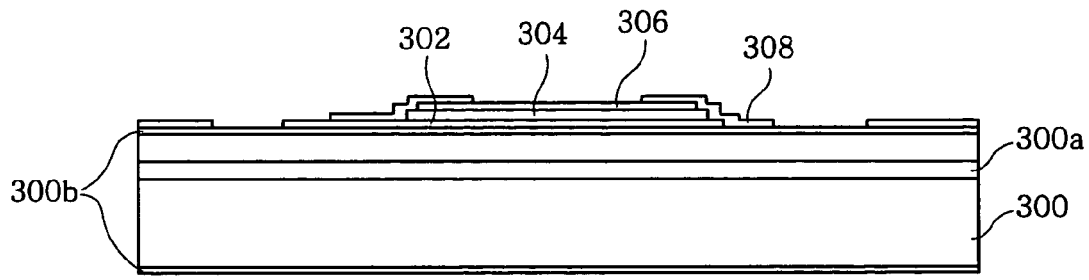

Then, after performing an annealing process for improving performance of the piezoelectric body 304, an insulating layer 308 for insulating the upper electrode 306 and the lower electrode 302 is formed and then a patterning process for patterning a part where a lining pattern 310 is to be formed by removing a certain part of the insulating layer 308 is performed, as shown in FIG. 13E.

Figure 13F:
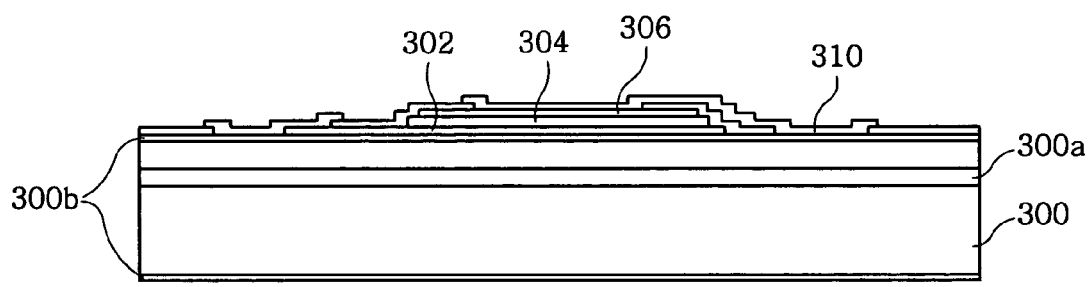

Still next, as shown in FIG. 13F, the lining pattern 310 is formed via a metallic coating, an etching and the like.

Figure 13G:
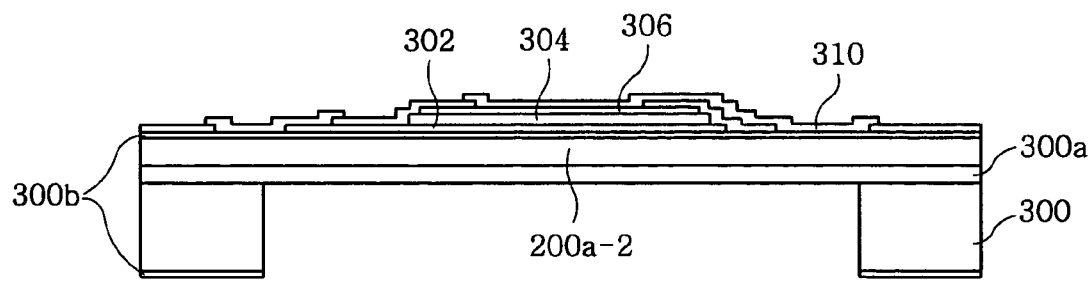

A thin membrane portion 200a-2 on the upper side of the central portion of the wafer 300 is further formed by deeply removing the lower side of the central portion of the wafer 300 via an deep etching or the like after removing the oxidation layer 300b on the bottom surface of the wafer 300 via an etching or the like, as shown in FIG. 13G. During the deep etching, a portion above the intermediate oxidation layer 300a is not subjected to the etching due to the existence of the layer 300a inserted into the wafer 300.

Figure 13H:
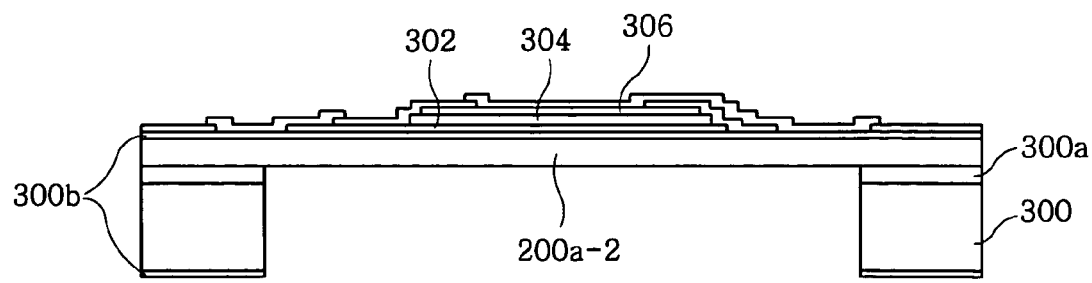

Finally, as shown in FIG. 13H, the membrane portion 200a-2 at the central portion of the wafer 300 is perfectly formed by finally removing the intermediate oxidation layer 300a via an etching or the like.

Consequently, the ultrasonic transducer 100 in accordance with the present invention is manufactured.

In accordance with the present invention, a ranging measurement with practically high directionality can be achieved via the ultrasonic transducer provided. More particularly, an ultrasonic ranging measurement capable of accurately identifying the spatial position of a target or a spatial mapping with high resolution can be performed. Besides, a spatial resolution can be improved, thereby greatly contributing to the performance improvement of the robots in case of being applied to a variety of industrial or home robots.

While the invention has been shown and described with respect to the preferred embodiments, it will be understood by those skilled in the art that various changes and modifications may be made without departing from the scope of the invention as defined in the following claims.

What is claimed is:

1. A multiple resonances type ultrasonic transducer for a ranging measurement using a parametric transmitting array in air, comprising:
    an ultrasonic actuator unit formed with a regularly mixing array of first unit actuators having a resonance frequency of $f_1$ and second unit actuators having a resonance frequency of $f_2$, for generating a difference frequency wave ($f_d = f_1 - f_2$) with high directionality by forming a parametric transmitting array in air through generating two ultrasonic waves with high pressure in air; and
    an ultrasonic sensor unit formed with one or more unit sensors having a resonance frequency of the difference frequency ($f_d = f_1 - f_2$), for sensing a reflected ultrasonic wave signal from a target,
    wherein the difference frequency ($f_d$) is selected within a range of about 20kHz ~60kHz.

2. The transducer of claim 1, wherein the ultrasonic actuator unit and the ultrasonic sensor unit are manufactured to be integrated on a same substrate in a thin plate form by using MEMS.

3. The transducer of claim 1, wherein the unit actuators and the unit sensors are formed with a same laminated structure, the laminated structure including:
    a substrate part, wherein an outer portion thereof is formed as a thick fixed supporting portion and the central portion thereof is formed as a thin membrane portion so that the membrane portion is vibrated vertically;
    a lower electrode formed on top surface of the substrate part;
    a piezoelectric body formed on the lower electrode, for deriving a vibration from the membrane portion by vibrating itself vertically according to an applied voltage thereto; and
    an upper electrode formed on the piezoelectric body, for applying a predetermined voltage to the piezoelectric body in cooperation with the lower electrode.

4. The transducer of claim 3, further comprising an insulating layer formed between the substrate part and the lower electrode, for insulating the substrate part.

5. The transducer of claim 1, further comprising:
    a first lining pattern for electrically connecting the unit actuators of the ultrasonic actuator unit with each other and a pair of first connecting terminals for electrically connecting the first lining pattern with a voltage source; and at least one second lining pattern, each being separately provided to an unit sensor of the ultrasonic sensor unit for an electrical connection thereof, and at least one pair of second connecting terminals, each for electrically connecting the second lining pattern with a voltage source.

6. The transducer of claim 1, wherein the regularly mixing array of the first unit actuators and the second unit actuators is one of (a) a square type mixing array, (b) a hexagonal type mixing array, and (c) a ring type mixing array.

7. The transducer of claim 3, wherein the structure of the membrane portion is one of (a) a general membrane type, (b) a cantilever type, and (c) a piston type.

8. The transducer of claim 3, wherein, in case the thickness of the membrane portion of the ultrasonic actuator unit and that of the ultrasonic sensor unit are identical, in order to relatively decrease the resonance frequency of the ultrasonic sensor unit, the membrane portion of the respective unit sensors has a size larger than that of the respective unit actuators, or the structure of the membrane portion of the respective unit sensors has a spring coefficient lower than that of the respective unit actuators.

9. The transducer of claim 1, wherein the length of one square side is determined to be about 30mm~50mm when assuming the ultrasonic transducer to be in a shape of a square, whereas the diameter thereof is set at about 30mm~60mm when assuming it to be in a circular shape.

10. The transducer of claim 1, wherein one unit sensor is provided at the central or any other portion of the ultrasonic transducer.

11. The transducer of claim 1, wherein two or more unit sensors are provided at the outer portion of the ultrasonic transducer.

12. The transducer of claim 3, wherein the electrodes of the unit actuators are connected with each other in series by connecting the upper electrode of one unit actuator with a lower electrode of its following unit actuator next thereto.

13. The transducer of claim 3, wherein the electrodes of the unit actuators are connected with each other in parallel by connecting the upper electrodes together and the lower electrodes together.

14. The transducer of claim 13, wherein the electrodes of the first and the second unit actuators are together connected with each other in parallel.

15. The transducer of claim 13, wherein the electrodes of the first unit actuators are connected with each other in parallel whereas the electrodes of the second unit actuators are connected with each other in parallel.

16. The transducer of claim 1, further comprising an upper housing and a lower housing respectively combined with the upper side and the lower side of the ultrasonic transducer, for protecting the ultrasonic transducer.

17. The transducer of claim 16, wherein the upper housing is of a grill type and the lower housing is manufactured with a sound-absorbing material.

18. A method for manufacturing multiple resonances type ultrasonic transducer for a ranging measurement with high directionality using a parametric transmitting array in air, comprising the steps of:

preparing an SOT (Silicon on Insulator) wafer with an intermediate oxidation layer;

insulating the SOT wafer by forming thin oxidation layers on the top and the bottom surfaces of the wafer;

forming a lower electrode, a piezoelectric body, and an upper electrode to be laminated in sequence on the top surface of the SOI wafer; patterning the upper electrode, the piezoelectric body, and the lower electrode;

forming an insulating layer for insulating the upper electrode and the lower electrode;

forming a lining pattern by patterning the insulating layer; and forming the membrane portion by removing the lower side of the central portion of the wafer and the intermediate oxidation layer after removing the oxidation layer on the bottom surface of the wafer.

19. The method of claim 18, further comprising the step of annealing for improving a performance of the piezoelectric body after forming the piezoelectric body.

* * * * *